(12) United States Patent
Schober et al.

(10) Patent No.: US 9,389,080 B2
(45) Date of Patent: Jul. 12, 2016

(54) RING LASER GYROSCOPE WITH INTEGRATED POLARIZATION

(71) Applicant: Honeywell International Inc., Morristown, NJ (US)

(72) Inventors: Christina Marie Schober, St. Anthony, MN (US); Bruce A. Seiber, Arden Hills, MN (US); Rodney Harold Thorland, Blaine, MN (US); James A. Vescera, Hopkins, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/150,348

(22) Filed: Jan. 8, 2014

(65) Prior Publication Data

US 2015/0192417 A1    Jul. 9, 2015

(51) Int. Cl.
| G01C 19/66 | (2006.01) |
| H01S 3/083 | (2006.01) |
| H01S 3/097 | (2006.01) |
| H01S 3/139 | (2006.01) |
| H01S 3/03 | (2006.01) |
| H01S 3/038 | (2006.01) |

(52) U.S. Cl.
CPC ............ G01C 19/662 (2013.01); G01C 19/661 (2013.01); H01S 3/0835 (2013.01); *H01S 3/03* (2013.01); *H01S 3/0385* (2013.01); *H01S 3/097* (2013.01); *H01S 3/139* (2013.01)

(58) Field of Classification Search
CPC .... G01C 19/66; G01C 19/661; G01C 19/662; G01C 19/664; G01C 19/665
USPC .................................................. 356/459, 469
See application file for complete search history.

(56) References Cited

U.S. PATENT DOCUMENTS

| 3,741,657 A | 6/1973 | Andringa |
| 4,899,346 A * | 2/1990 | Perkins ........................... 372/32 |
| 4,900,137 A * | 2/1990 | Carter ...................... 359/485.04 |

(Continued)

FOREIGN PATENT DOCUMENTS

EP      0106573      4/1984

OTHER PUBLICATIONS

Aronowitz, "Fundamentals of the Ring Laser Gyro", "http://ftp.rta.nato.int/Public/PubFullText/RTO/AG/RTO-AG-339/$AG-339-03.PDF", Apr. 28, 2000, pp. 3-1 thru 3-45, Publisher: NATO Research and Technology Organisation.
Ralli et al., "9.1: Intrinsic Polarizers—Ultra Durable Dichroic Polarizers for LCD Projection", May 2007, pp. 1-4, Publisher: 3M, Published in: US.

(Continued)

*Primary Examiner* — Jonathan Hansen
(74) *Attorney, Agent, or Firm* — Fogg & Powers LLC

(57) ABSTRACT

A ring laser gyroscope comprises a laser block that defines an optical closed loop pathway configured to contain a lasing gas. A plurality of mirror structures are respectively mounted on the laser block, with each of the mirror structures having a respective reflective surface that is in optical communication with the optical closed loop pathway. A plurality of electrodes are coupled to the laser block, with the electrodes configured to generate a pair of counter-propagating laser beams from the lasing gas in the optical closed loop pathway. At least one optical sensor is coupled to one of the mirror structures, with the optical sensor in optical communication with the closed loop pathway. A polarizer is in optical communication with the optical sensor. The polarizer is configured to pass laser light having substantially one polarization mode to the optical sensor.

20 Claims, 8 Drawing Sheets

(56) References Cited

U.S. PATENT DOCUMENTS

| | | | |
|---|---|---|---|
| 4,968,136 A * | 11/1990 | Lim et al. | 356/469 |
| 5,137,358 A | 8/1992 | Perkins | |
| 5,420,683 A | 5/1995 | Hall | |
| 6,618,151 B2 | 9/2003 | Killpatrick et al. | |
| 6,704,111 B2 | 3/2004 | Ecklund et al. | |
| 7,330,269 B2 * | 2/2008 | Zurn et al. | 356/459 |
| 2008/0089381 A1 * | 4/2008 | Backes et al. | 372/94 |
| 2011/0274133 A1 * | 11/2011 | Schober et al. | 372/59 |

OTHER PUBLICATIONS

European Patent Office, "Extended European Search Report", from Foreign Counterpart of U.S. Appl. No. 14/150,348, Jun. 1, 2015, pp. 1-7, Published in: EP.

Andrews et al., "Sources of Error and Noise in a Magnetic Mirror Gyro", IEEE Journal of Quantum Electronics, Mar. 1996, pp. 543-548, vol. 32, No. 3, Publisher: IEEE.

Krebs et al., "Applications of Magneto-Optics in Ring Laser Gyroscopes", IEEE Transactions on Magnetics, Sep. 1980, pp. 1179-1184, vol. 16, No. 5, Publisher: IEEE.

* cited by examiner

RING LASER GYROSCOPE WITH INTEGRATED POLARIZATION

BACKGROUND

A ring laser gyroscope typically includes a solid block of a dielectric material having a plurality of interconnected passages that are arranged in a closed loop to create a resonant cavity. Reflective surfaces are positioned at the intersection of each of the passages, and a lasing gas is contained within the resonant cavity. Electrical potentials applied to the lasing gas generate counter-propagating laser beams in the resonant cavity. The ring laser gyroscope utilizes interference of the laser beams within the resonant cavity to detect changes in orientation and rate of turn.

Under certain conditions, the laser power of some ring laser gyroscopes may be too noisy or too low to operate effectively. This occurs when more than one polarization mode of the laser beams exists in the resonant cavity of these ring laser gyroscopes.

SUMMARY

A ring laser gyroscope comprises a laser block that defines an optical closed loop pathway configured to contain a lasing gas. A plurality of mirror structures are respectively mounted on the laser block, with each of the mirror structures having a respective reflective surface that is in optical communication with the optical closed loop pathway. A plurality of electrodes are coupled to the laser block, with the electrodes configured to generate a pair of counter-propagating laser beams from the lasing gas in the optical closed loop pathway. At least one optical sensor is coupled to one of the mirror structures, with the optical sensor in optical communication with the closed loop pathway. A polarizer is in optical communication with the optical sensor. The polarizer is configured to pass laser light having substantially one polarization mode to the optical sensor.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A ring laser gyroscope is provided with integrated polarization for laser intensity control. For example, one or more polarizers can be implemented at various locations outside of a resonant cavity on the ring laser gyroscope. The polarizers allow laser light with substantially one polarization mode to pass from the resonant cavity to one or more optical sensors.

Use of substantially one polarization mode improves clarity of the laser optical signals in the ring laser gyroscope. The polarizers can be implemented in the ring laser gyroscope using multiple techniques as described in further detail hereafter.

Figure 1A:
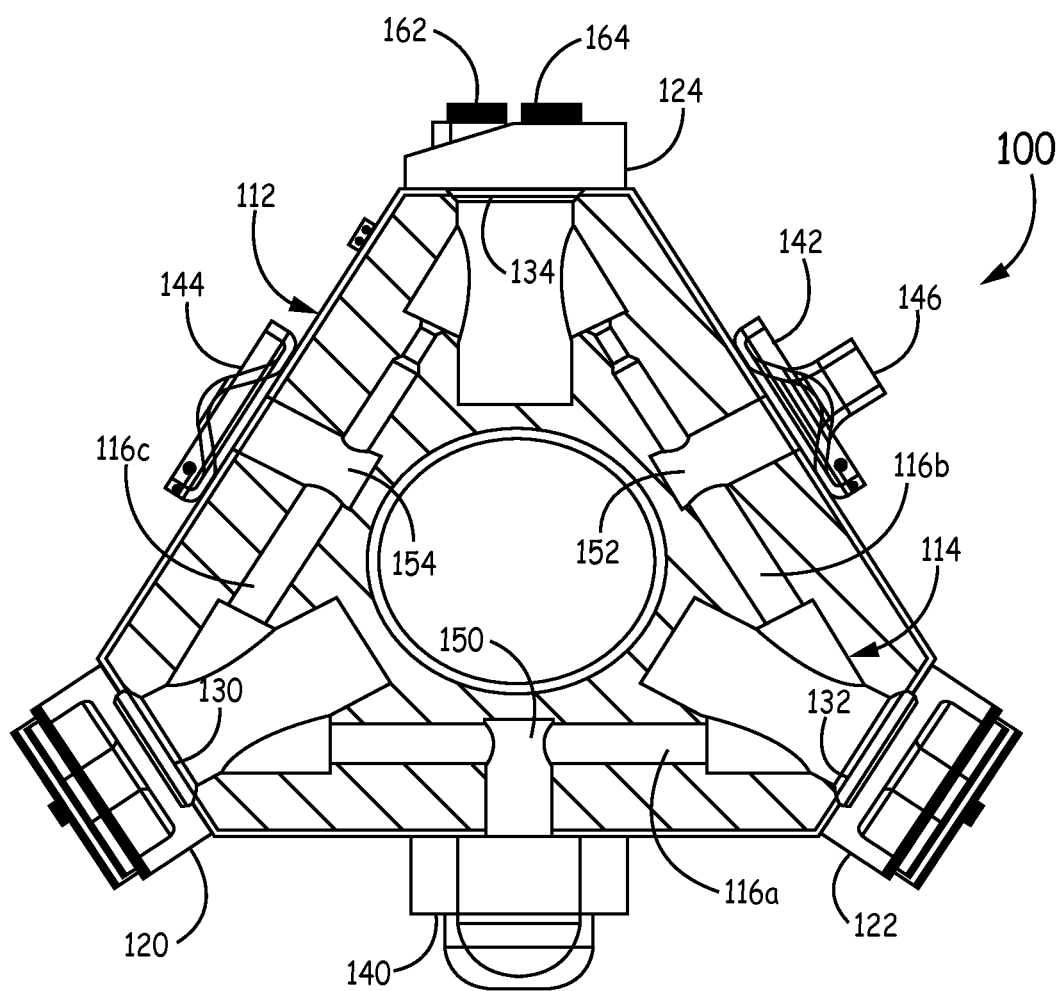
FIGS. 1A and 1B are top views of a ring laser gyroscope according to one embodiment, which can be implemented with a polarizer.
Figure 1B:
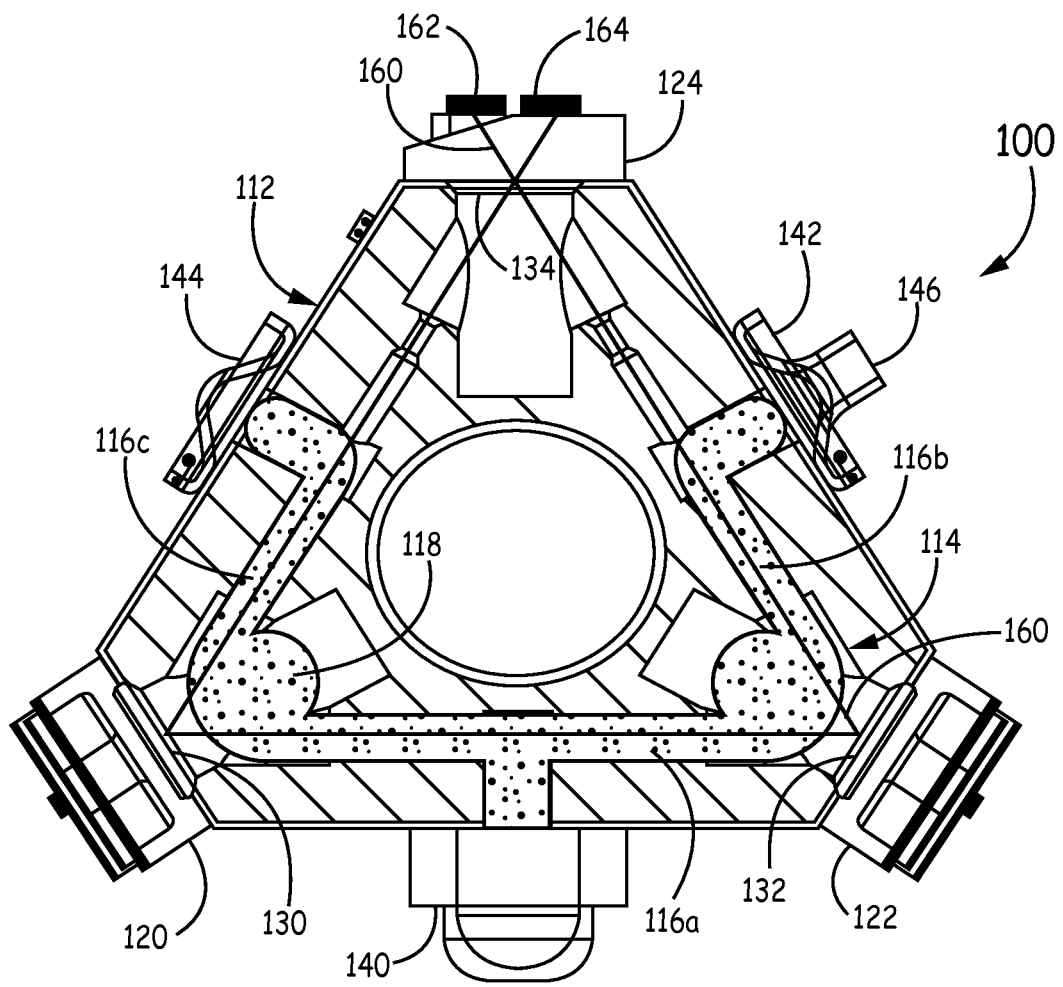

FIGS. 1A and 1B illustrate a ring laser gyroscope 100 in accordance with one embodiment, which can be implemented with a polarizer in a nonmagnetic application. The ring laser gyroscope 100 includes a laser block 112 having a resonant cavity in the form of an optical closed loop pathway 114, which has a substantially triangular shape. The closed loop pathway 114 includes a plurality of interconnected passages 116a, 116b, and 116c that are configured to be filled with a lasing gas, such as a mixture of helium and neon.

A plurality of mirror structures 120, 122, and 124 are respectively mounted on laser block 112 at each corner of closed loop pathway 114. Each of mirror structures 120, 122, and 124 has a respective reflective surface 130, 132, and 134 that is positioned and appropriately angled at the intersections of passages 116a, 116b, and 116c to reflect light from one passage into another passage.

The ring laser gyroscope 100 further includes a cathode 140 mounted on one side of laser block 112, and a pair of anodes 142, 144 mounted on the other opposing sides of laser block 112. The cathode 140 is in communication with passage 116a through a channel 150 in laser block 112. The anode 142 is in communication with the passage 116b through a channel 152 in laser block 112. The anode 144 is in communication with passage 116c through a channel 154 in laser block 112. In order to facilitate adding of the lasing gas into closed loop pathway 114, anode 142 can be fitted with a fill port 146.

The cathode 140 and anodes 142, 144 are configured to generate an electrical potential through the lasing gas in closed loop pathway 114. This creates a gas plasma discharge region 118 between cathode 140 and anodes 142, 144, as shown in FIG. 1B. When gas plasma discharge region 118 is excited by a sufficient voltage, gas discharge currents flow in opposite directions, from anode 142 to cathode 140 and from anode 144 to cathode 140. These gas discharge currents generate a pair of counter-propagating laser beams 160 within closed loop pathway 114 that travel along the same optical path by reflection from reflective surfaces 130, 132, and 134.

A photo detector device 162 is coupled to mirror structure 124 and is in optical communication with closed loop pathway 114. The photo detector device 162 includes a polarizer, which is configured to pass laser light in a single polarization mode from laser beams 160 to photo detector device 162. The photo detector device 162 is used to measure the intensity of the laser light, which allows the cavity length of closed loop pathway 114 to be adjusted depending upon operating conditions.

The reflective surface 134 of mirror structure 124 is partially optically transmissive, which allows a portion of a laser beam 160 to pass therethrough to photo detector device 162, as illustrated in FIG. 1B. The mirror structures 120 and 122 have mechanisms that allow the positions of reflective surfaces 130 and 132 to be changed in order to adjust the cavity length of closed loop pathway 114.

An optical sensor array 164 is also coupled to mirror structure 124 and is in optical communication with photo detector 162 to measure the angular rate. In one embodiment, a polarizer can also be coupled to sensor array 164 such that laser light in a single polarization mode is incident on sensor array 164.

Rotation of ring laser gyroscope 100 causes the effective path length for the two laser beams to change, thus producing a frequency difference between the two beams, which can be used to determine the angular rate.

Figure 2A:
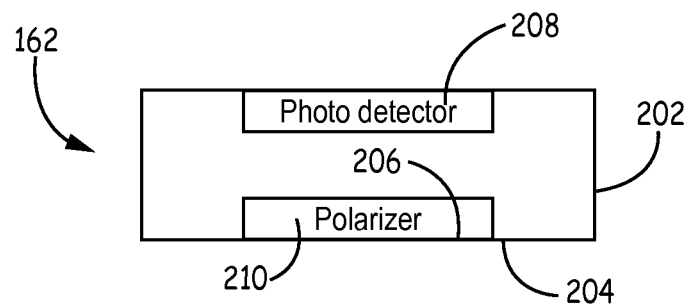
FIGS. 2A and 2B are side views of a photo detector device that includes a polarizer according to one embodiment.
Figure 2B:
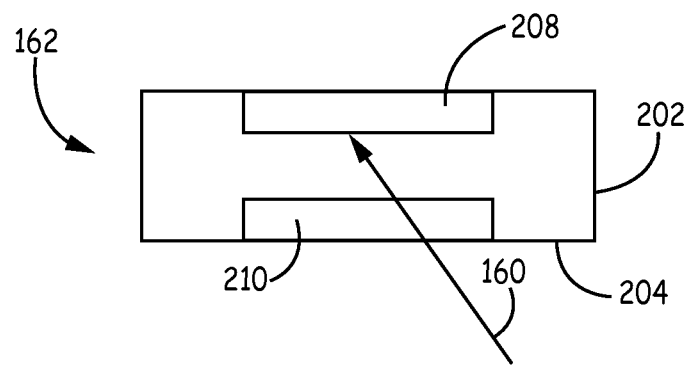

As mentioned previously, photo detector device 162 includes a polarizer, which can be implemented in various alternative embodiments. In one embodiment, illustrated in FIGS. 2A and 2B, photo detector device 162 is implemented in a package 202 that includes a package window 204 with an inner surface 206 that faces a photo detector die 208 such as a photodiode inside of package 202. A polarizer layer 210 is located on inner surface 206 of package window 204. As shown in FIG. 2B, laser beam 160 passes through package window 204 and polarizer layer 210 prior to being incident on photo detector die 208.

Figure 3A:
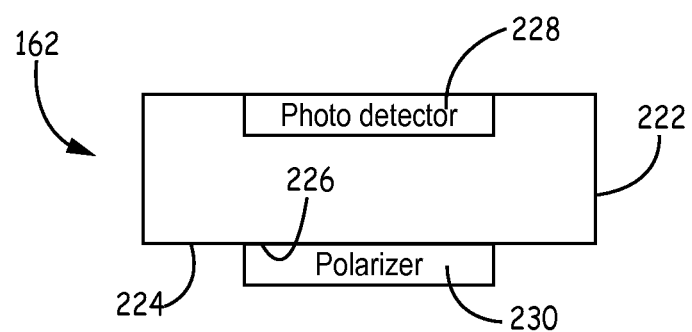
FIGS. 3A and 3B are side views of a photo detector device that includes a polarizer according to another embodiment.
Figure 3B:
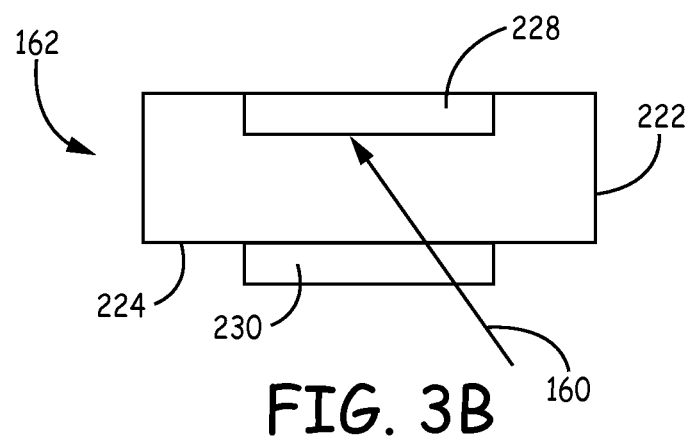

In another embodiment, illustrated in FIGS. 3A and 3B, photo detector device 162 is implemented in a package 222 that includes a package window 224 with an outer surface 226 that is opposite a photo detector die 228 inside of package 222. A polarizer layer 230 is located on outer surface 226 of package window 224. As shown in FIG. 3B, laser beam 160 passes through polarizer layer 230 and package window 224 prior to being incident on photo detector die 228.

Figure 4A:
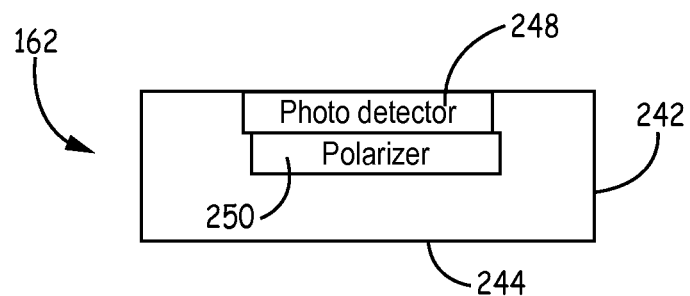
FIGS. 4A and 4B are side views of a photo detector device that includes a polarizer according to a further embodiment.
Figure 4B:
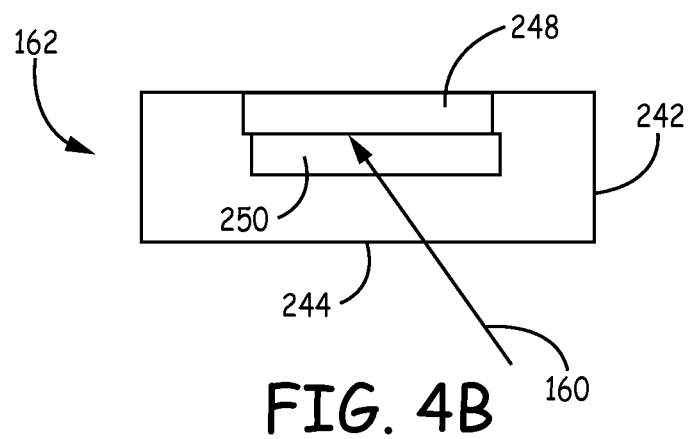

In a further embodiment, illustrated in FIGS. 4A and 4B, photo detector device 162 is implemented in a package 242 that includes a package window 244 that is opposite to a photo detector die 248 inside of package 242. A polarizer layer 250 is located over photo detector die 248 and faces package window 244. For example, polarizer layer 250 can be a polarizing film formed on the surface of one or more photodiodes. As shown in FIG. 4B, laser beam 160 passes through package window 244 and than polarizer layer 250 prior to being incident on photo detector die 248.

In implementing any of the foregoing embodiments, the polarizer layer can be a preformed polarizer film or sheet that is attached to the package window or the photo detector die such as with an optical adhesive. Alternatively, the polarizer layer can be a polarizer coating that is formed directly on the package window or the photo detector die, such as with conventional surface deposition techniques.

The polarizer layer can be composed of a polarization filter material that produces a single polarization mode for the laser beam. For example, a p-polarization film or coating material that substantially passes p-polarized light can be utilized. Alternatively, an s-polarization film or coating material that substantially passes s-polarized light can be used. In some embodiments, the polarization material needs to be operative over a wide temperature range as the ring laser gyroscope can be subject to various environmental conditions during use.

In one implementation, operating the ring laser gyroscope in an s-polarization mode achieves a reduced Angle Random Walk (ARW) quantum limit, which is a measure of the noise output from the ring laser gyroscope. In addition, employing an s-polarization film in the ring laser gyroscope improves signal clarity and signal strength, allowing for other optimizations to occur to improve performance.

Figure 5:
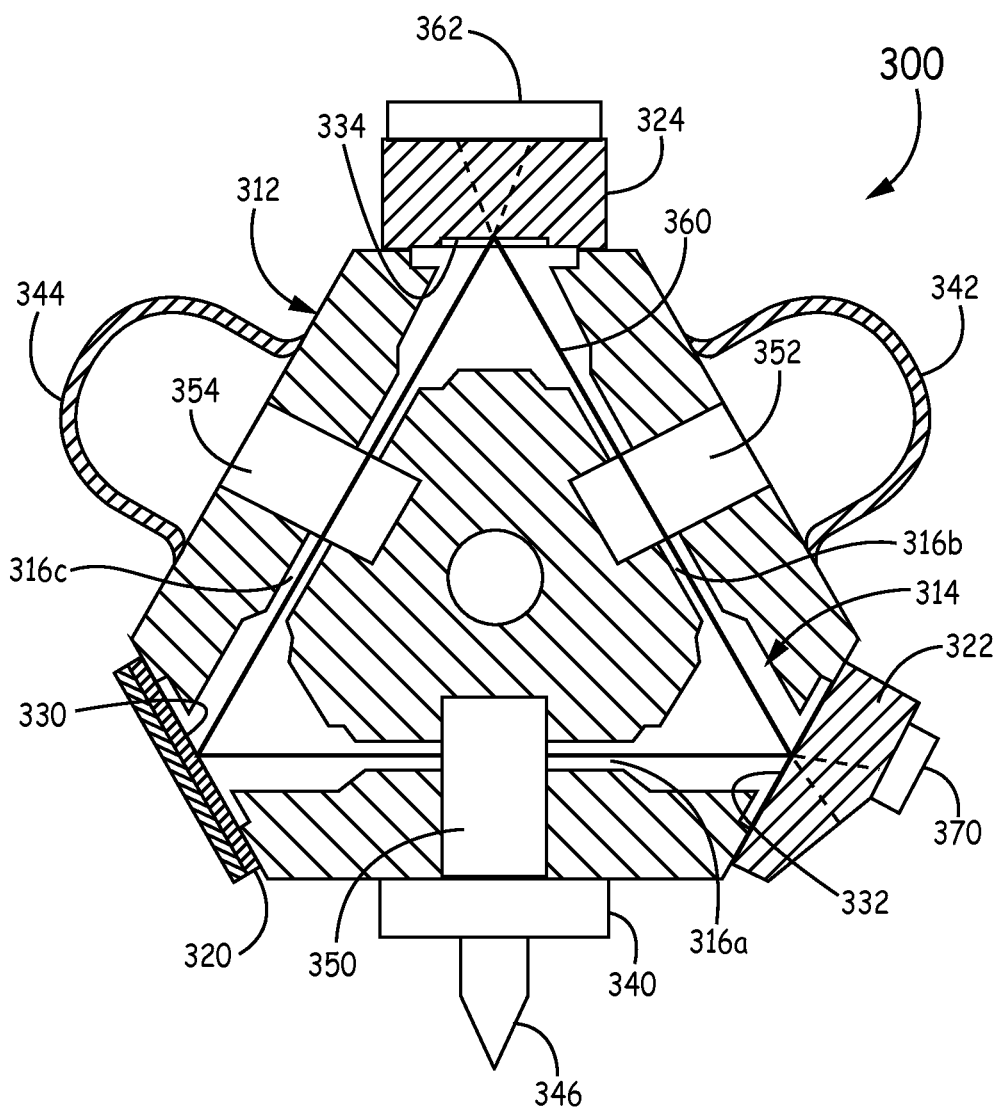
FIG. 5 is a top cross-sectional view of a ring laser gyroscope according to another embodiment, which can be implemented with a polarizer.

FIG. 5 illustrates a ring laser gyroscope 300 according to another embodiment, which can be implemented with a polarizer. The ring laser gyroscope 300 includes a laser block 312 that defines an optical closed loop pathway 314 that has a substantially triangular shape. The closed loop pathway 314 includes a plurality of interconnected passages 316a, 316b, and 316c that are configured to be filled with a lasing gas.

A plurality of mirror structures 320, 322, and 324 are respectively mounted on laser block 312 at each corner of closed loop pathway 314. Each of mirror structures 320, 322, and 324 has a respective reflective surface 330, 332, and 334 that is positioned and appropriately angled at the intersections of passages 316a, 316b, and 316c to reflect light from one passage into another passage.

The ring laser gyroscope 300 further includes an anode 340 mounted on one side of laser block 312, and a pair of cathodes 342, 344 mounted on the other opposing sides of laser block 312. The anode 340 is in communication with passage 316a through a channel 350 in laser block 312. The cathode 342 is in communication with the passage 316b through a channel 352 in laser block 312. The cathode 344 is in communication with passage 316c through a channel 354 in laser block 312. In order to facilitate adding of the lasing gas, anode 340 can be fitted with a fill port 346. The anode 340 and cathodes 342, 344 are configured to generate an electrical potential through the lasing gas in closed loop pathway 314. This generates a pair of counter-propagating laser beams 360 within closed loop pathway 314 that each travel along the same optical path by reflection from reflective surfaces 330, 332, and 334.

A photo detector device 362 is coupled to mirror structure 324 and is in optical communication with closed loop pathway 314. The photo detector device 362 includes a polarizer, which is configured to pass laser light in a single polarization mode from laser beams 360 to photo detector device 362. In one embodiment, photo detector device 362 is a dual laser intensity monitor (LIM) sensor.

The reflective surface 334 of mirror structure 324 is partially optically transmissive, which allows a portion of laser beams 360 to pass therethrough to photo detector device 362. The reflective surface 332 of mirror structure 322 is also partially optically transmissive, allowing a portion of laser beams 360 to pass therethrough to a readout sensor 370. In one embodiment, a polarizer can also be coupled to readout sensor 370 such that laser light in a single polarization mode is incident on readout sensor 370.

The polarizer can be implemented with photo detector device 362 according to the various embodiments discussed previously. For example, in one embodiment, a polarizer layer can be located on an inner surface of a package window of photo detector device 362. In another embodiment, a polarizer layer can be located on an outer surface of the package window of photo detector device 362. In a further embodiment, a polarizer layer can be located on a photo detector die that faces the package window of photo detector device 362.

Figure 6:
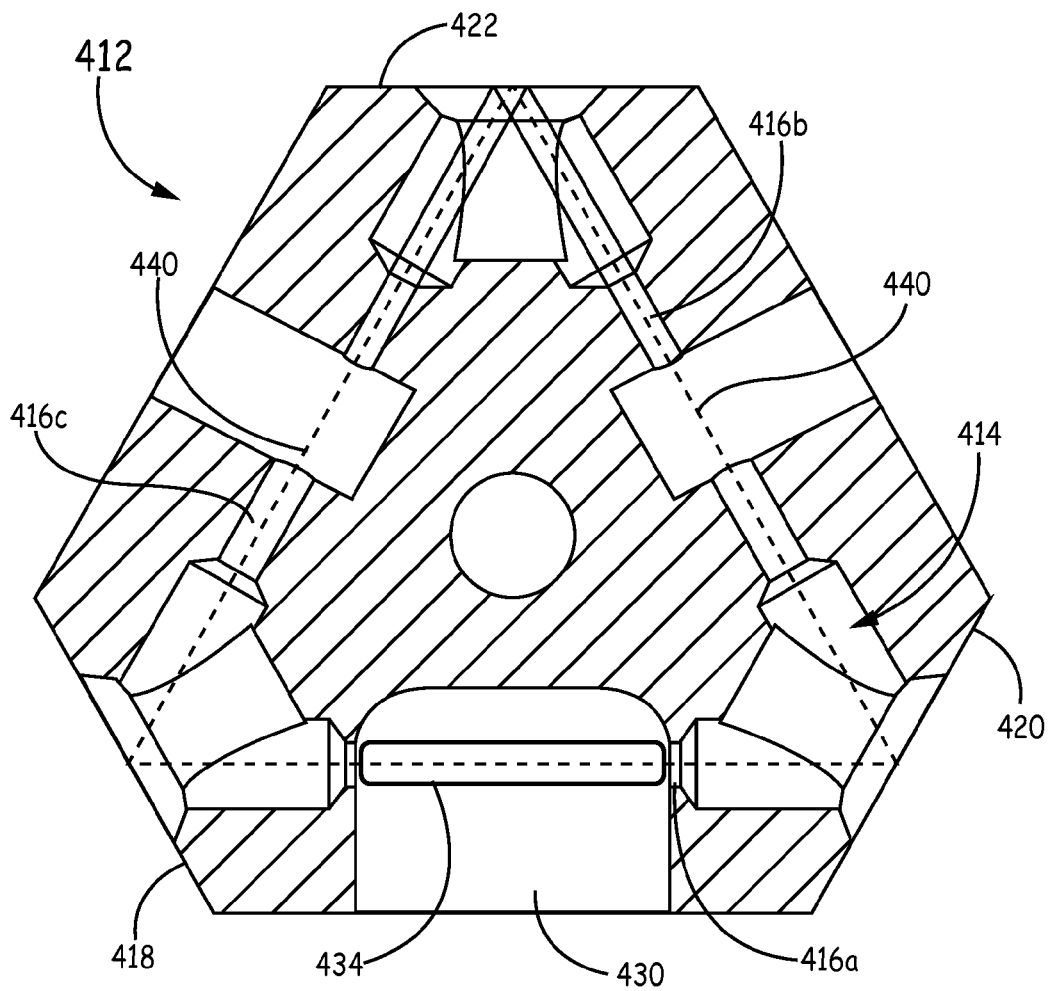
FIG. 6 is a top view of a laser block for a ring laser gyroscope according to one embodiment.
Figure 7:
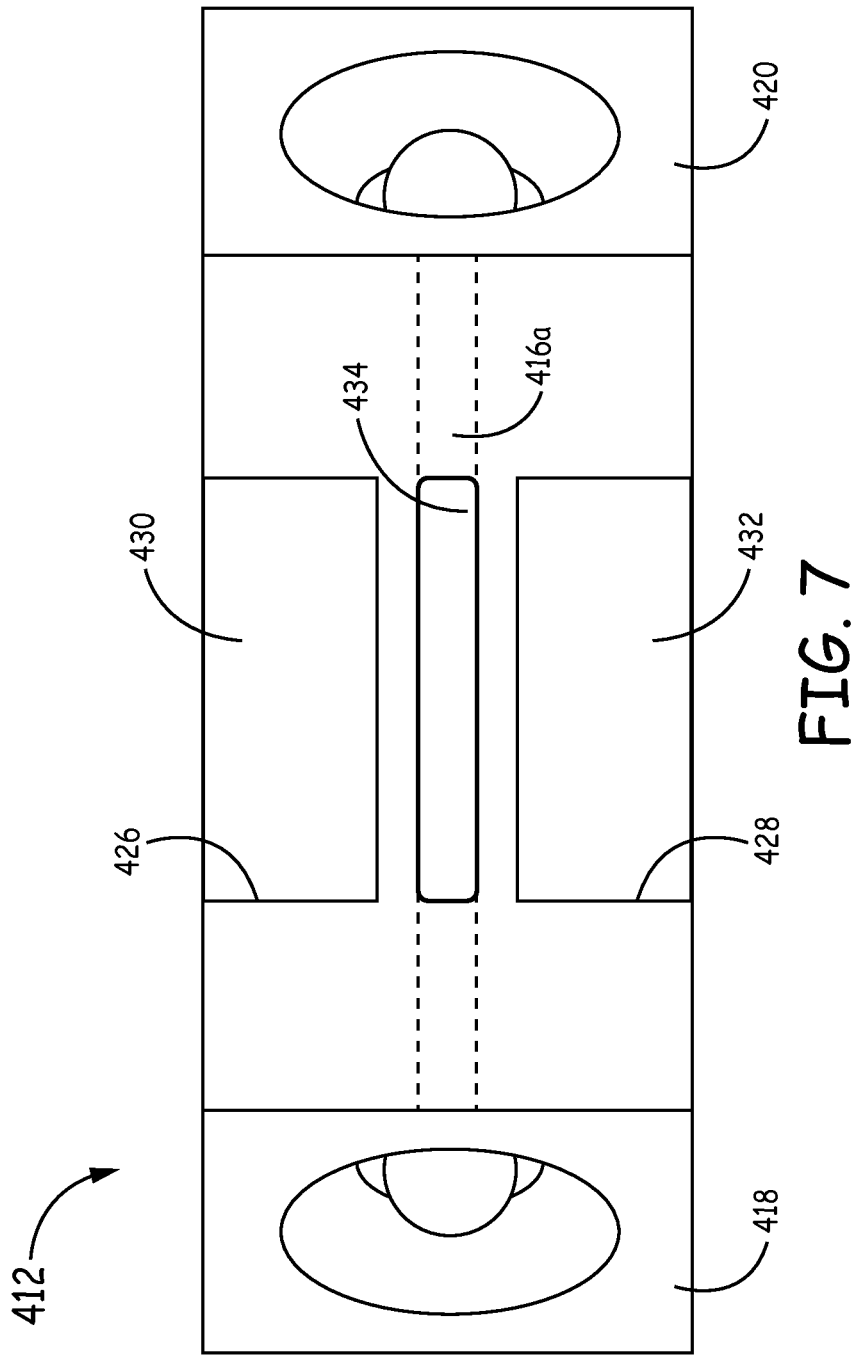
FIG. 7 is a side view of the laser block of FIG. 6.

FIGS. 6 and 7 illustrate an alternative embodiment of a laser block 412 for a ring laser gyroscope that can be implemented with a polarizer. The laser block 412 defines an optical closed loop pathway 414 that has a substantially triangular shape. The closed loop pathway 414 includes a plurality of interconnected passages 416a, 416b, and 416c that are configured to be filled with a lasing gas. The laser block 412 has beveled corners 418, 420, and 422, which are configured to be mounted with corresponding mirror structures such that the reflective surfaces of the mirror structures reflect light from one passage into another passage of closed loop pathway 414.

The laser block 412 further includes a pair of recesses 426 and 428 along one side thereof that is adjacent to passage 416a. A pair of electrodes 430 and 432 is respectively mounted in recesses 426 and 428 on opposite sides of passage 416a, as depicted in FIG. 7. The electrodes 430 and 432 are configured to create a capacitive radio frequency (RF) discharge region 434 of the lasing gas in passage 416a. The discharge region 434 generates a pair of counter-propagating laser beams within closed loop pathway 414 that each travel along the same optical path 440, as shown in FIG. 6.

One or more polarizers can be implemented, as discussed previously, in one or more optical sensors that are employed in a ring laser gyroscope that utilizes laser block 412. The polarizers filter output laser beams that pass through the polarizers, such that a signal collected by an optical sensor has substantially a single polarization.

EXAMPLE EMBODIMENTS

Example 1 includes a ring laser gyroscope comprising a laser block that defines an optical closed loop pathway configured to contain a lasing gas; a plurality of mirror structures respectively mounted on the laser block, each of the mirror structures having a respective reflective surface that is in optical communication with the optical closed loop pathway; a plurality of electrodes coupled to the laser block, the electrodes configured to generate a pair of counter-propagating laser beams from the lasing gas in the optical closed loop pathway; at least one optical sensor coupled to one of the mirror structures, the optical sensor in optical communication with the closed loop pathway; and a polarizer in optical communication with the optical sensor, the polarizer configured to pass laser light having substantially one polarization mode to the optical sensor.

Example 2 includes the ring laser gyroscope of Example 1, wherein the optical sensor comprises a photo detector device.

Example 3 includes the ring laser gyroscope of Example 2, wherein the photo detector device comprises a package that includes a package window that faces a photo detector die inside of the package.

Example 4 includes the ring laser gyroscope of Example 3, wherein the polarizer comprises a polarizing layer located inside of the package on an inner surface of the package window such that the laser light passes through the package window and then the polarizing layer prior to being incident on the photo detector die.

Example 5 includes the ring laser gyroscope of Example 3, wherein the polarizer comprises a polarizing layer located outside of the package on an outer surface of the package window such that the laser light passes through the polarizing layer and then the package window prior to being incident on the photo detector die.

Example 6 includes the ring laser gyroscope of Example 3, wherein the polarizer comprises a polarizing layer located inside of the package over the photo detector die and facing the package window such that the laser beam passes through the package window and then the polarizing layer prior to being incident on the photo detector die.

Example 7 includes the ring laser gyroscope of any of Examples 1-6, further comprising a readout sensor coupled to one of the mirror structures.

Example 8 includes the ring laser gyroscope of Example 7, further comprising a polarizing layer coupled to the readout sensor such that laser light having substantially one polarization mode is incident on the readout sensor.

Example 9 includes the ring laser gyroscope of any of Examples 1-8, wherein the polarizer comprises an s-polarization film that substantially passes s-polarized light.

Example 10 includes the ring laser gyroscope of any of Examples 1-8, wherein the polarizer comprises a p-polarization film that substantially passes p-polarized light.

Example 11 includes the ring laser gyroscope of any of Examples 1-10, wherein an odd number of mirror structures are mounted on the laser block.

Example 12 includes the ring laser gyroscope of any of Examples 1-11, wherein the plurality of electrodes include a cathode mounted on a first side of the laser block, a first anode mounted on a second side of the laser block, and a second anode mounted on a third side of the laser block.

Example 13 includes the ring laser gyroscope of any of Examples 1-11, wherein the plurality of electrodes include an anode mounted on a first side of the laser block, a first cathode mounted on a second side of the laser block, and a second cathode mounted on a third side of the laser block.

Example 14 includes the ring laser gyroscope of any of Examples 1-13, wherein the plurality of electrodes are configured to apply an electrical potential through the lasing gas to create a gas plasma discharge region in the optical closed loop pathway to generate the counter-propagating laser beams.

Example 15 includes the ring laser gyroscope of any of Examples 1-11, wherein the plurality of electrodes include a pair of electrodes mounted in opposing recesses on one side of the laser block adjacent to the optical closed loop pathway.

Example 16 includes the ring laser gyroscope of Example 15, wherein the pair of electrodes is configured to create a capacitive radio frequency discharge region of the lasing gas in the optical closed loop pathway to generate the counter-propagating laser beams.

Example 17 includes a ring laser gyroscope comprising a laser block including a plurality of interconnected passages that define an optical closed loop pathway having a substantially triangular shape, the optical closed loop pathway configured to contain a lasing gas; a plurality of mirror structures, each of the mirror structures respectively mounted at a corner of the laser block and having a respective reflective surface that is in optical communication with the optical closed loop pathway; a plurality of electrodes coupled to the laser block, the electrodes configured to generate a pair of counter-propagating laser beams from the lasing gas in the optical closed loop pathway; a photo detector device coupled to one of the mirror structures and in optical communication with the closed loop pathway, wherein the reflective surface of the mirror structure on which the photo detector device is coupled is partially optically transmissive to allow passage of a portion of the laser beams; and a polarizing film coupled to the photo detector device and configured to substantially pass s-polarized light from the portion of the laser beams to the photo detector device.

Example 18 includes the ring laser gyroscope of Example 17, wherein the plurality of electrodes are configured to apply an electrical potential through the lasing gas to create a gas plasma discharge region in the optical closed loop pathway to generate the counter-propagating laser beams.

Example 19 includes the ring laser gyroscope of Example 17, wherein the pair of electrodes is configured to create a capacitive radio frequency discharge region of the lasing gas in the optical closed loop pathway to generate the counter-propagating laser beams.

Example 20 includes the ring laser gyroscope of any of Examples 17-19, further comprising a readout sensor coupled to one of the mirror structures; and a polarizing film coupled to the readout sensor, the polarizing film configured to pass laser light having substantially one polarization mode to the readout sensor.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A ring laser gyroscope, comprising:
a laser block that defines an optical cavity having an optical closed loop pathway configured to contain a lasing gas;
a plurality of mirror structures respectively mounted on the laser block, each of the mirror structures having a respective reflective surface that is in optical communication with the optical closed loop pathway, wherein each of the mirror structures has a nonmagnetic construction;
a plurality of electrodes coupled to the laser block, the electrodes configured to generate a pair of counter-propagating laser beams from the lasing gas in the optical closed loop pathway;
at least one optical sensor coupled to one of the mirror structures, the optical sensor in optical communication with the optical closed loop pathway; and
a polarizer directly coupled to the optical sensor outside of the optical cavity, the polarizer configured to pass laser light having substantially one polarization mode to the optical sensor;
wherein the ring laser gyroscope is in a nonmagnetic configuration, and the optical sensor is configured to measure intensity of the laser light having substantially one polarization mode, which allows a length of the optical closed loop pathway to be adjusted.

2. The ring laser gyroscope of claim 1, wherein the optical sensor comprises a photo detector device.

3. The ring laser gyroscope of claim 2, wherein the photo detector device comprises a package that includes a package window that faces a photo detector die inside of the package.

4. The ring laser gyroscope of claim 3, wherein the polarizer comprises a polarizing layer located inside of the package on an inner surface of the package window such that the laser light passes through the package window and then the polarizing layer prior to being incident on the photo detector die.

5. The ring laser gyroscope of claim 3, wherein the polarizer comprises a polarizing layer located outside of the package on an outer surface of the package window such that the laser light passes through the polarizing layer and then the package window prior to being incident on the photo detector die.

6. The ring laser gyroscope of claim 3, wherein the polarizer comprises a polarizing layer located inside of the package over the photo detector die and facing the package window such that the laser beam passes through the package window and then the polarizing layer prior to being incident on the photo detector die.

7. The ring laser gyroscope of claim 1, further comprising a readout sensor coupled to one of the mirror structures.

8. The ring laser gyroscope of claim 7, further comprising a polarizing layer coupled to the readout sensor such that laser light having substantially one polarization mode is incident on the readout sensor.

9. The ring laser gyroscope of claim 1, wherein the polarizer comprises an s-polarization film that substantially passes s-polarized light.

10. The ring laser gyroscope of claim 1, wherein the polarizer comprises a p-polarization film that substantially passes p-polarized light.

11. The ring laser gyroscope of claim 1, wherein an odd number of mirror structures are mounted on the laser block.

12. The ring laser gyroscope of claim 1, wherein the plurality of electrodes include a cathode mounted on a first side of the laser block, a first anode mounted on a second side of the laser block, and a second anode mounted on a third side of the laser block.

13. The ring laser gyroscope of claim 1, wherein the plurality of electrodes include an anode mounted on a first side of the laser block, a first cathode mounted on a second side of the laser block, and a second cathode mounted on a third side of the laser block.

14. The ring laser gyroscope of claim 1, wherein the plurality of electrodes are configured to apply an electrical potential through the lasing gas to create a gas plasma discharge region in the optical closed loop pathway to generate the counter-propagating laser beams.

15. The ring laser gyroscope of claim 1, wherein the plurality of electrodes include a pair of electrodes mounted in opposing recesses on one side of the laser block adjacent to the optical closed loop pathway.

16. The ring laser gyroscope of claim 15, wherein the pair of electrodes is configured to create a capacitive radio frequency discharge region of the lasing gas in the optical closed loop pathway to generate the counter-propagating laser beams.

17. A ring laser gyroscope, comprising:
a laser block having an optical cavity including a plurality of interconnected passages that define an optical closed loop pathway having a substantially triangular shape, the optical closed loop pathway configured to contain a lasing gas;
a first mirror structure, a second mirror structure, and a third mirror structure, each of the mirror structures respectively mounted at a corner of the laser block and having a respective reflective surface that is in optical communication with the optical closed loop pathway, the first and second mirror structures each including a mechanism that changes a position of the respective reflective surface to adjust the length of the optical closed loop pathway;
a plurality of electrodes coupled to the laser block, the electrodes configured to generate a pair of counter-propagating laser beams from the lasing gas in the optical closed loop pathway;
a photo detector device coupled to the third mirror structure and in optical communication with the optical closed loop pathway, wherein the reflective surface of the third mirror structure is partially optically transmissive to allow passage of a portion of the laser beams; and
a polarizing film directly coupled to the photo detector device outside of the optical cavity and configured to substantially pass s-polarized light from the portion of the laser beams to the photo detector device;
wherein the ring laser gyroscope is in a nonmagnetic configuration, and the photo detector device is configured to measure intensity of the s-polarized light, which allows a length of the optical closed loop pathway to be adjusted based on changes to the position of the respective reflective surface of the first or second mirror structures in response to the measured intensity of the s-polarized light.

18. The ring laser gyroscope of claim 17, wherein the plurality of electrodes are configured to apply an electrical potential through the lasing gas to create a gas plasma discharge region in the optical closed loop pathway to generate the counter-propagating laser beams.

19. The ring laser gyroscope of claim 17, wherein the pair of electrodes is configured to create a capacitive radio frequency discharge region of the lasing gas in the optical closed loop pathway to generate the counter-propagating laser beams.

20. The ring laser gyroscope of claim 17, further comprising:
- a readout sensor coupled to one of the mirror structures; and
- a polarizing film coupled to the readout sensor, the polarizing film configured to pass laser light having substantially one polarization mode to the readout sensor.

* * * * *